(12) United States Patent
Quijano et al.

(10) Patent No.: US 9,454,864 B2
(45) Date of Patent: Sep. 27, 2016

(54) FEEDER MODULE WITH FORCE SENSING ADJUSTMENT

(71) Applicant: NCR Corporation, Duluth, GA (US)

(72) Inventors: Vincent Quijano, Cadiz (PH); Gervil Villarosa, Cebu (PH); Carlo B. Granaderos, Talisay (PH)

(73) Assignee: NCR Corporation, Duluth, GA (US)

( * ) Notice: Subject to any disclaimer, the term of this patent is extended or adjusted under 35 U.S.C. 154(b) by 128 days.

(21) Appl. No.: 14/448,528

(22) Filed: Jul. 31, 2014

(65) Prior Publication Data

US 2016/0035171 A1 Feb. 4, 2016

(51) Int. Cl.
| | |
|---|---|
| *G07D 13/00* | (2006.01) |
| *G07D 11/00* | (2006.01) |
| *G01L 19/00* | (2006.01) |
| *B65H 1/02* | (2006.01) |

(52) U.S. Cl.
CPC ....... *G07D 11/0036* (2013.01); *G01L 19/0061* (2013.01); *B65H 1/025* (2013.01)

(58) Field of Classification Search
CPC .. G07D 11/00; G07D 11/021; G07D 11/003; G07D 11/0036; G07D 2211/00; G01L 5/0038; G01L 5/009; B65H 1/025; B65H 1/14; B65H 1/16
USPC .......................... 194/343; 271/145, 149, 162
See application file for complete search history.

(56) References Cited

U.S. PATENT DOCUMENTS

| | | | | |
|---|---|---|---|---|
| 6,293,539 | B1 * | 9/2001 | Fukatsu | B65H 1/14 271/110 |
| 2007/0296202 | A1 * | 12/2007 | Zwahlen | G07D 11/00 283/58 |
| 2010/0059920 | A1 * | 3/2010 | Kern | B65H 1/025 271/2 |

* cited by examiner

*Primary Examiner* — Mark Beauchaine
(74) *Attorney, Agent, or Firm* — Schwegman, Lundberg & Woessner; Paul W. Martin

(57) ABSTRACT

A stack of valuable media for separation within deposit module are inserted into a feeder module. A force sensor regularly receives force readings as the stack of notes are depleted and a pressure paddle is regularly adjusted to maintain a constant and optimal amount of force on the stack of notes using the force readings.

20 Claims, 7 Drawing Sheets

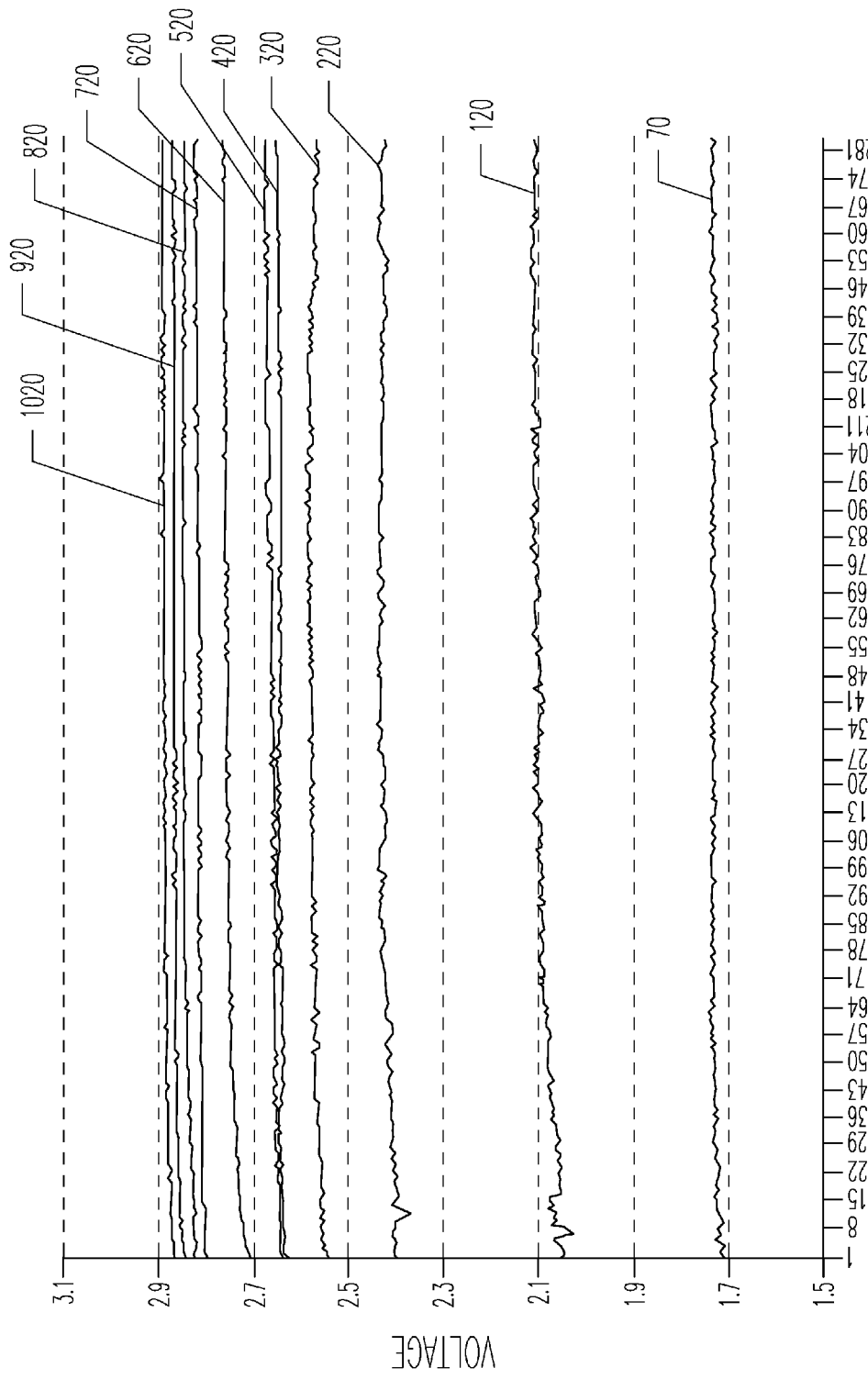

| FORCE (g) | VOLTAGE (V) | STANDARD DEVIATION (V) |
|---|---|---|
| 70 | 1.732 | 0.005 |
| 120 | 2.095 | 0.017 |
| 220 | 2.426 | 0.012 |
| 320 | 2.575 | 0.008 |
| 420 | 2.645 | 0.004 |
| 520 | 2.662 | 0.008 |
| 620 | 2.752 | 0.011 |
| 720 | 2.814 | 0.005 |
| 820 | 2.843 | 0.007 |
| 920 | 2.866 | 0.005 |
| 1020 | 2.886 | 0.005 |

TIME INTERVAL PER TRIAL = 8 SECONDS

Fig. 1C-2

FEEDER MODULE WITH FORCE SENSING ADJUSTMENT

BACKGROUND

Some, currency deposit modules embedded within Automated Teller Machines (ATMs) include the ability to accept a stack of notes, such as currency and/or checks. Each note is individually pulled from the inserted stack and inspected to determine whether that note should be rejected and dispensed back out to the customer or whether that note should be accepted and routed appropriately within the ATM.

One problem with existing approaches is that as the stack of notes gets depleted within the ATM, the force needed to ensure that a single note is pulled from the depleted stack increases and when the force is not optimal errors can occur, such as two notes being selected or jams occurring within the deposit module's feeder mechanism.

Therefore, the challenge is that for optimal note stack processing, within a deposit module, a constant and optimal amount of force needs to maintained on the stack of notes as the stack of notes are depleted during processing. Heretofore, this has not been addressed adequately in the industry.

SUMMARY

In various embodiments, a feeder module and methods for sensing and maintaining an optimal force are provided for value media stack processing.

According to an embodiment, a feeder module is provided. The feeder module includes a force resistor and a circuit board. The circuit board adapted and configured to: i) obtain a force reading for a stack of value media being processed through the feeder module from the force resistor and ii) communicate the force reading to a controller of a deposit module to automatically adjust varying forces to maintain a particular force within the feeder module.

BRIEF DESCRIPTION OF THE DRAWINGS

FIGS. 1C-1 and 1C-2 is single diagram depicted as two-separate diagrams (1C-1 and 1C-2) (due to size) depicting trial results showing force applied and voltage used to stacks of notes processed through the feeder module of the FIG. 1A, according to an example embodiment.

FIG. 2 is a diagram of a method for force sensing in a feeder module of a deposit module, according to an example embodiment.

DETAILED DESCRIPTION

Figure 1A:
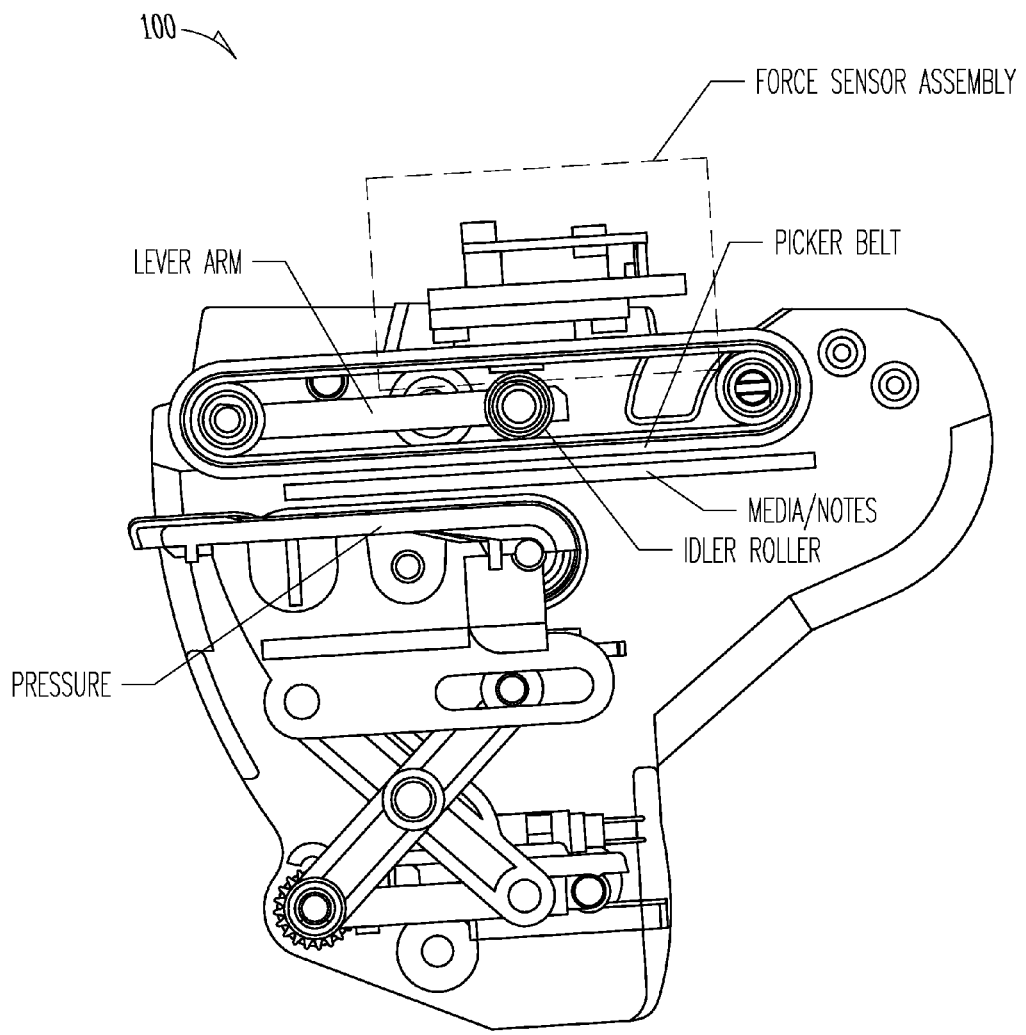
FIG. 1A is a diagram of a feeder module of a scalable deposit module for an Automated Teller Machine (ATM), according to an example embodiment.

FIG. 1A is a diagram of a feeder module 100 of a scalable deposit module for an Automated Teller Machine (ATM), according to an example embodiment. It is to be noted that only a relevant section of the deposit module that is being altered and enhanced is shown in the FIG. 1A. Therefore, the FIG. 1A shows only those components relevant to understanding what has been added and modified to a conventional deposit modules by way of enhancements to the feeder module 100 to provide novel force sensing and force maintenance on stacks of notes inserted into the feeder module for separation within the deposit module of the ATM.

As used herein, the phrase "value media" refers to media of value, such as currency, checks, coupons, value tickets, and the like.

For purposes of the discussions that follow with respect to the FIGS. 1A-1D, "value media" is referred to as "notes."

Figure 1B:
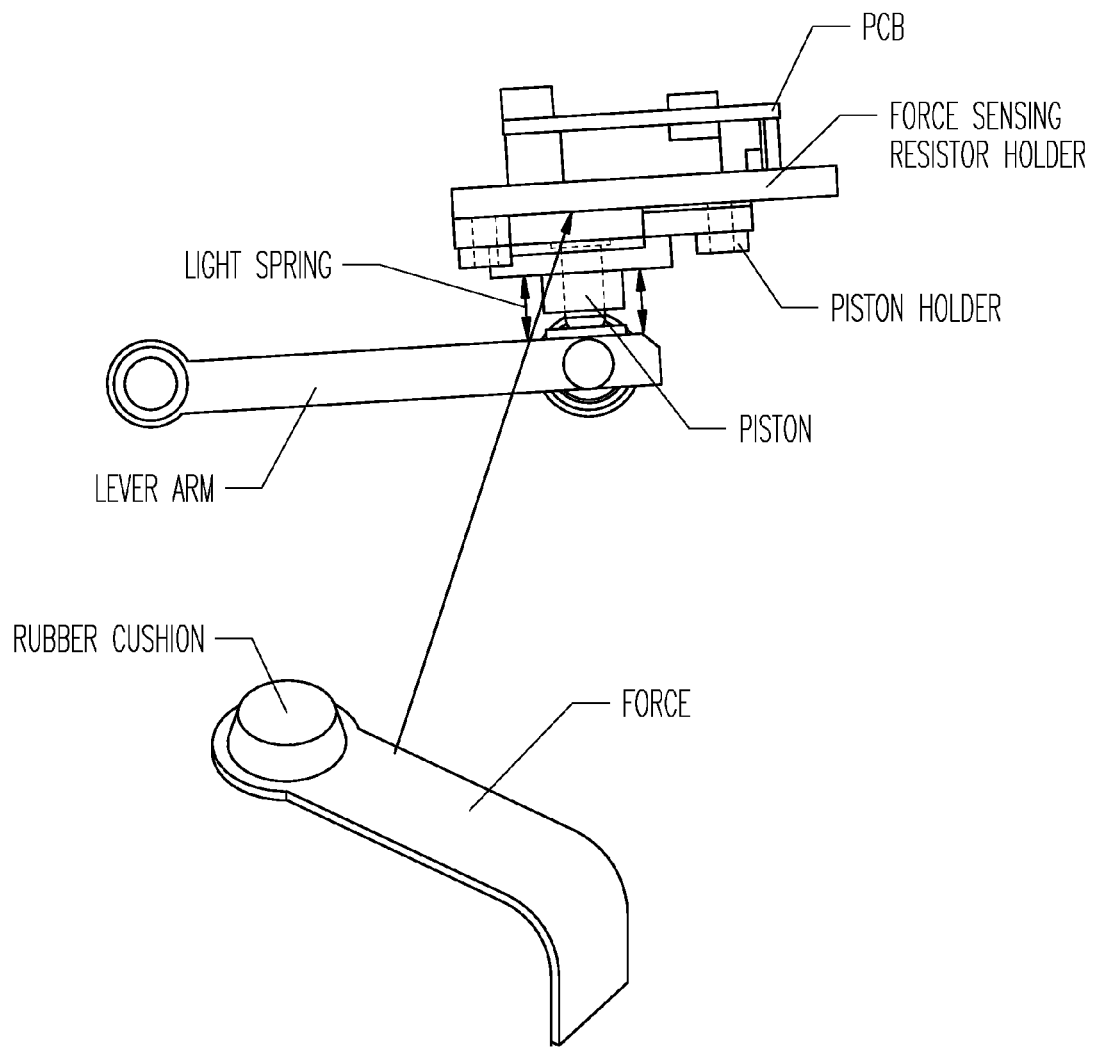
FIG. 1B is a diagram depicting a force sensing module and other components of the feeder module depicted in the FIG. 1A, according to an example embodiment.

It is also noted that also some dimensions and measurements may be implied from the FIGS. 1A-1B, these dimensions and measurements may be altered without departing from the novel teachings presented herein for force sensing and force maintenance on stacks of notes processed through the feeder module 100 of a deposit module.

The feeder module 100 includes a variety of components, only the ones relevant to understanding the embodiments of the invention are discussed herein.

The feeder module 100 includes a force sensor assembly, a picker belt, media/notes, an idler roller, a pressure paddle, and a lever arm.

The force sensor assembly provides measurements of the force being experienced by the feeder module 100 by the stack of notes.

The pressure paddle moves up and down. As the paddle moves up, the note stack is pushed against the picker belts. Above the picker belts are the idler rollers, which are assembled to a lever arm. The lever arm then actuates the force sensing resistor (shown in the FIG. 1B).

The force sensing assembly (shown in greater detail in the FIG. 1B) provides the capability to recognize how much force is developing between the stack of notes and the picker belts, the pressure paddle can then be automatically positioned to a height where an optimal or constant amount of force is applied which is ideal for processing the remainder of the stack of notes through the feeder module 100.

FIG. 1B is a diagram depicting a force sensing module and other components of the feeder module depicted in the FIG. 1A, according to an example embodiment.

The force sensing module includes a force sensing resistor holder that is used for gathering force measurements. The lever arm hits the force sensor resistor through a piston. The amount of force actuated on the force sensor resistor is converted by a force sensor circuit into equivalent voltage. The force resistor is shown at the bottom of the FIG. 1B. The rubber cushion is placed down against the piston and the tailed end is inserted into the force sensing resister holder where it is interfaced to the printed circuit board (force sensor circuit) and voltage is acquired that corresponds to the force.

Once the ideal force is attained, the pressure paddle will maintain its position and the feeder module 100 will continue to separate a single note from the stack of notes being processed to the deposit module.

The printed circuit board gathers voltage data that corresponds to the force applied by the stack of notes against the picker belts and sends this to the controller of the deposit module. The deposit module then adjusts the pressure paddle upward (against the stack of notes from the bottom to increase force) or downward (away from the stack of notes to decrease force). The printed circuit board takes more readings and communicates back to the controller of the deposit module. This is a continuous feedback loop in which information from the printed circuit board drives the deposit module to continually adjust the force exerted against the stack of notes through movement of the pressure paddle.

In an embodiment, the optimal force maintained against the stack of notes and the picker belts is about 120 g of force.

The printed circuit board and/or the controller of the deposit module can be configured to achieve a user-defined optimal force.

In an embodiment, the optimal force can be changed based on the mechanical components and operating environment associated with the feeder module 100. So, any mechanical, operating environment, or external environmental factors (atmospheric pressure, temperature, humidity, etc.) can be accounted for in configuring the optimal force for a given feeder module.

So it is to be understood that optimal force can change based on a given feeder module, a given deposit module, a given ATM, a given operating environment of the ATM (relative to other machinery), and given external factors.

Figure 1D:
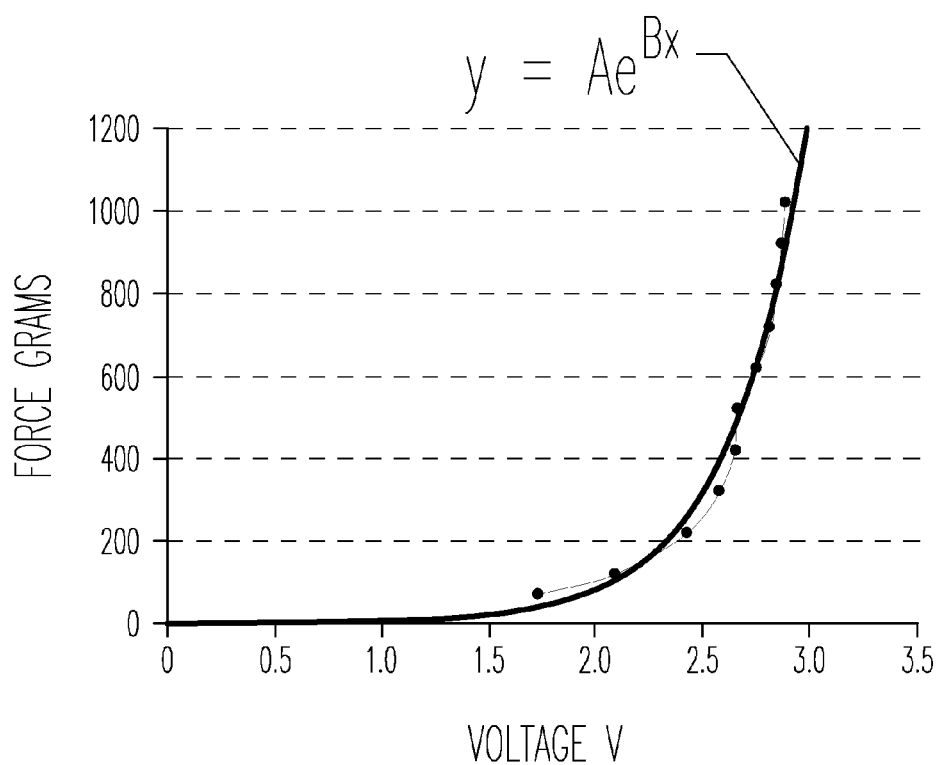
FIG. 1D is a diagram depicting a curve fitting graph to describe the relationship between voltage and force for the trial results depicted in the FIG. 1C, according to an example embodiment.
Figure 2:
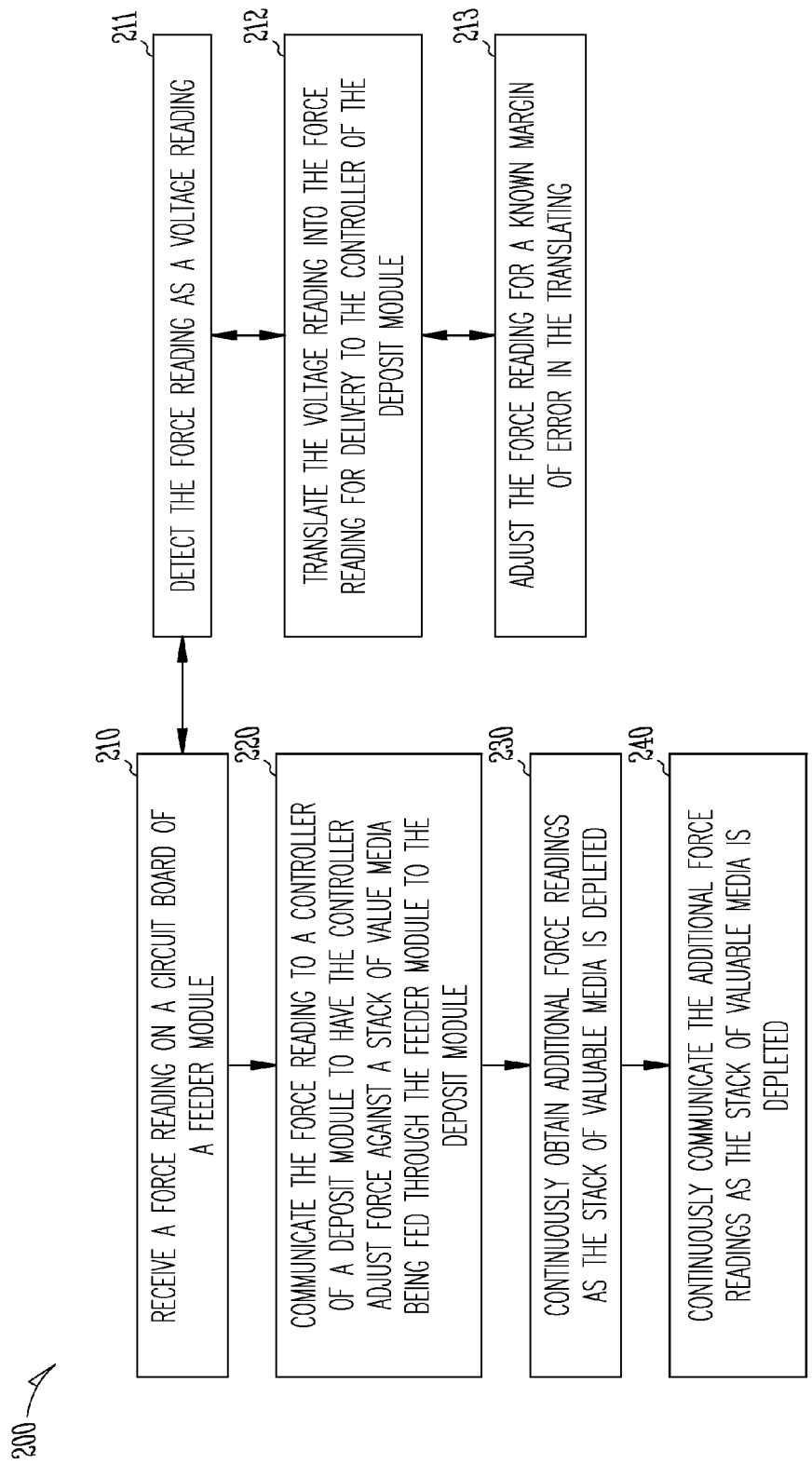

FIGS. 1C-1 and 1C-2 is single diagram depicted as two-separate diagrams (1C-1 and 1C-2) (due to size) depicting trial results showing force applied and voltage used to stacks of notes processed through the feeder module of the FIG. 1A, according to an example embodiment.

The chart and corresponding table in the FIG. 1C show the repeatability of data from the force sensing resistor (FIG. 1B). That is, the force applied tracks to an equivalent voltage. Only a very small standard deviation was realized after over 280 actuations of 8 seconds intervals in each force (g) value. The data is reliable and consistent. Force applied is directly related to voltage detected. The printed circuit board uses the voltage detected to imply the force of the stack of notes pressed against the picker belts.

FIG. 1D is a diagram depicting a curve fitting graph to describe the relationship between voltage and force for the trial results depicted in the FIGS. 1C-1 and 1C-2, according to an example embodiment FIG. 1D uses data curve fitting using a balanced exponential fit. Curve fitting was done to properly describe the relationship between voltage and force curves gathered during the trial (the results of which are depicted in the FIGS. 1C-1 and 1C-2). A balanced exponential fit method provided a root-mean-square error (RMSE) of 49.3 g, which provides the needed accuracy when the acceptable error rate is set to 10% (60.9 g).

Thus: Regression Analysis has a RMSE=49.3 g and if the acceptable error is 10 then the Acceptable RMSE←60.9 g.

In an embodiment, the novel dispenser module modified with the improved feeder module 100 is integrated into an ATM.

In an embodiment, the novel dispenser module modified with the improved feeder module 100 is integrated into a SST.

In an embodiment, the novel dispenser module modified with the improved feeder module 100 is integrated into a self-service checkout station.

One now appreciates how a deposit module having a feeder module 100 can be enhanced to sense force of the stack of notes within the feeder module 100 and maintain an optimal force against the stack of notes as the stack of notes are individually processed and fed through the deposit module and the stack of notes are depleted.

These and other embodiments are now discussed with reference to the FIGS. 2-3.

FIG. 2 is a diagram of a method 200 for force sensing in a feeder module of a deposit module, according to an example embodiment. The method 200 is implemented as one or more software modules as executable instructions that are programmed within memory or non-transitory computer readable storage media and executed by a processing device. The software module(s) are referred to herein as a "note force sensor." The note force sensor may or may not have access to a network, and any such network may be wired, wireless, or a combination of wired and wireless.

The note force sensor processes on a feeder module having one or more processors.

In an embodiment, the note force sensor is processed by the printed circuit board of the feeder module 100 of the FIG. 1.

In an embodiment, the feeder module is integrated into an ATM.

In an embodiment, the feeder module is integrated into a SST.

In an embodiment, the feeder module is integrated into a self-service checkout station.

In an embodiment, the feeder module is integrated into a kiosk.

In an embodiment, the value media is currency.

In an embodiment, the value media is a coupon.

In an embodiment, the value media is a value ticket.

In an embodiment, the value media is a check.

In an embodiment, the value media is combinations of some or all of: currency, coupons, value tickets, and checks.

At 210, the note force sensor receives a force reading on a circuit board of a feeder module. One mechanism for achieving this was discussed above with reference to the FIGS. 1A-1D.

According to an embodiment, at 211, the note force sensor detects the force reading as a voltage reading.

In an embodiment of 211 and at 212, the note force sensor translates the voltage reading into the force reading for delivery to the controller of the deposit module (discussed below at 220).

In an embodiment of 212 and at 213, the note force sensor adjusts the force reading for a known margin of error in translating from the voltage reading to the force reading. A sample known margin of error was discussed above with reference to the FIG. 1D.

At 220, the note force sensor communicates the force reading to a controller of a deposit module to have the controller adjust force against a stack of valuable media being fed through the feeder module to the deposit module.

According to an embodiment, at 230, the note force sensor continuously obtains additional force readings as the stack of valuable media is depleted.

In an embodiment of 230 and at 240, the note force sensor continuously communicates additional force readings as the stack of valuable media is depleted.

Figure 3:
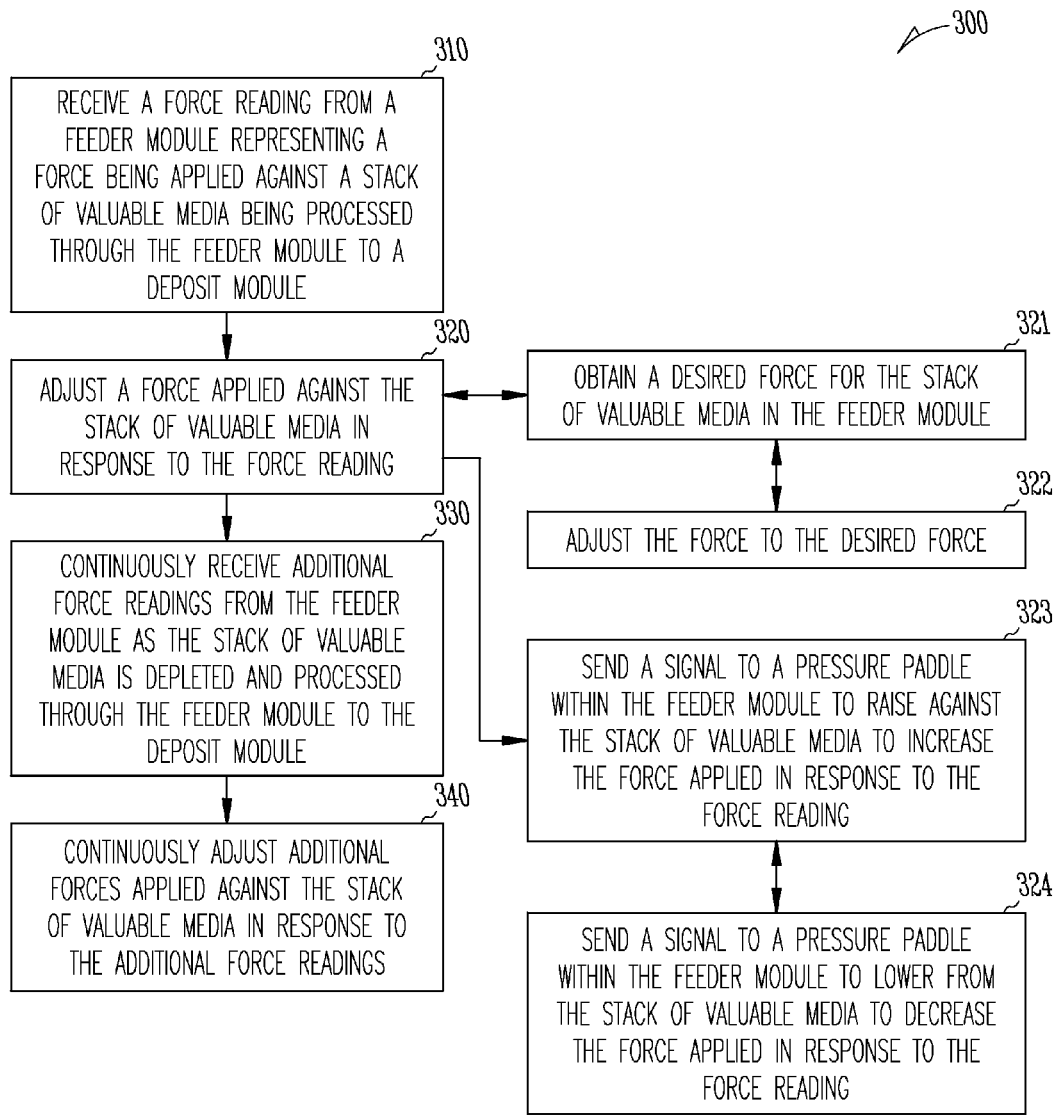
FIG. 3 is a diagram of a method for maintaining optimal force on a stack of notes in a feeder module of a deposit module, according to an example embodiment.

FIG. 3 is a diagram of a method for maintaining optimal force on a stack of notes in a feeder module of a deposit module, according to an example embodiment. The method 300 is implemented as one or more software modules as executable instructions that are programmed within memory or non-transitory computer readable storage media and executed by a processing device. The software module(s) are referred to herein as a "deposit module force controller." The deposit module force controller may or may not have access to a network, and any such network may be wired, wireless, or a combination of wired and wireless.

The deposit module force controller presents processing actions of a deposit module that interfaces with the note force sensor of the feeder module presented in the FIG. 2. That is, the note force sensor of the feeder module communicates force readings to the deposit module force controller and the deposit module force controller increases or decreases force against a stack of value media being fed through the feeder module.

The deposit module force controller is processed on one or more processors of a deposit module.

In an embodiment, the deposit module is integrated into an ATM.

In an embodiment, the deposit module is integrated into an SST.

In an embodiment, the deposit module is integrated into a self-service checkout station.

In an embodiment, the deposit module is integrated into a kiosk.

In an embodiment, the value media is currency.

In an embodiment, the value media is a coupon.

In an embodiment, the value media is a value ticket.

In an embodiment, the value media is a check.

In an embodiment, the value media is combinations of some or all of: currency, coupons, value tickets, and checks.

At 310, the deposit module force controller receives a force reading from a feeder module representing a force being applied against a stack of valuable media being processed through the feeder module to a deposit module.

In an embodiment, the feeder module is the feeder module 100 of the FIG. 1A.

At 320, the deposit module force controller adjusts a force applied against a stack of valuable media in response to the force reading.

In an embodiment, at 321, the deposit module force controller obtains a desired force for the stack of valuable media in the feeder module. This is the configured optimal force. In an embodiment, the optimal force (desired force is about 120 g force). In an embodiment, the optimal force is configured based on the feeder module, the operating environment of the feeder module and the deposit module, and external factors.

In an embodiment of 321 and at 322, the deposit module force controller adjusts the force to the desired force.

In an embodiment, at 323, the deposit module force controller sends a signal to a pressure paddle within the feeder module to rise against the stack of valuable media to increase the force applied in response to the force reading.

In an embodiment, at 324, the deposit module force controller sends a signal to a pressure paddle within the feeder module to lower from the stack of valuable media to decrease the force applied in response to the force reading.

According to an embodiment, at 330, the deposit module force controller continuously receives additional force readings from the feeder module as the stack of valuable media is depleted and processed through the feeder module to the deposit module.

In an embodiment of 330 and at 340, the deposit module force controller continuously adjusts additional forces applied against the stack of valuable media in response to the additional force readings.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A feeder module, comprising:
   a force resistor; and
   circuit board adapted and configured to: i) obtain a force reading from the force resistor, the force reading for a stack of valuable media being processed through the feeder module and ii) communicate the force reading to a controller of a deposit module to automatically adjust varying forces to maintain a particular force within the feeder module, wherein a first end of the force resistor is in contact with a piston that moves as force is applied to the stack of value media and a second end of the force resistor is in contact with the circuit board.

2. The feeder module of claim 1, wherein the first end of the force resistor includes a rubber cushion that is adapted to interface a top end of the piston.

3. The feeder module of claim 1, wherein the second end of the force resistor curves upward into a force sensing resistor holder below the circuit board.

4. The feeder module of claim 1, wherein the circuit board is further adapted and configured, in i), to detect the force reading as a voltage reading that corresponds to the force reading.

5. The feeder module of claim 4, wherein the circuit board is further adapted and configured, in ii), to convert the voltage reading to the force reading before communicating the force reading to the controller of the deposit module.

6. The feeder module of claim 1, wherein the circuit board is further adapted and configured, in i), to: detect the force reading when a lever arm hits the force resistor through the piston, the lever arm hits the force resistor in response to the controller of the deposit module raising a pressure paddle against the stack of value media.

7. A method, comprising:
   receiving a force reading from a force resistor in contact with a piston that moves as force is applied to a stack of valuable media by circuit board of a feeder module; and
   communicating the force reading to a controller of a deposit module to have the controller adjust force against a stack of value media being fed through the feeder module to the deposit module.

8. The method of claim 7, wherein receiving further includes detecting the force reading as a voltage reading.

9. The method of claim 8, wherein detecting further includes translating the voltage reading into the force reading for delivery to the controller of the deposit module.

10. The method of claim 9, wherein translating further includes adjusting the force reading for a known margin of error in the translating.

11. The method of claim 10 further comprising, continuously communicating the additional force readings as the stack of valuable media is depleted.

12. The method of claim 7 further comprising, continuously obtaining additional force readings as the stack of valuable media is depleted.

13. A method, comprising:
receiving a force reading from a feeder module representing a force being applied against a stack of valuable media being processed through the feeder module to a deposit module; and
adjusting a force applied against the stack of valuable media in response to the force reading, wherein adjusting includes sending a signal to a pressure paddle within the feeder module to raise and lower the pressure paddle in response to the force reading.

14. The method of claim 13, wherein adjusting further includes obtaining a desired force for the stack of valuable media in the feeder module.

15. The method of claim 14, wherein obtaining further includes adjusting the force to the desired force.

16. The method of claim 13, further comprising continuously receiving additional force readings from the feeder module as the stack of valuable media is depleted and processed through the feeder module to the deposit module.

17. The method of claim 16 further comprising, continuously adjusting additional forces applied against the stack of valuable media in response to the additional force readings.

18. A feeder module, comprising:
a force resistor; and
circuit board adapted and configured to: i) obtain a force reading from the force resistor, the force reading for a stack of valuable media being processed through the feeder module and ii) communicate the force reading to a controller of a deposit module to automatically adjust varying forces to maintain a particular force within the feeder module;
wherein the circuit board is further adapted and configured, in i), to: detect the force reading when a lever arm hits the force resistor through a piston, the lever arm hits the force resistor in response to the controller of the deposit module raising a pressure paddle against the stack of value media.

19. A method, comprising:
receiving a force reading on a circuit board of a feeder module, including detecting the force reading as a voltage reading, wherein detecting includes translating the voltage reading into the force reading for delivery to the controller of the deposit module, and wherein translating includes adjusting the force reading for a known margin of error in the translating; and
communicating the force reading to a controller of a deposit module to have the controller adjust force against a stack of value media being fed through the feeder module to the deposit module.

20. The method of claim 19, further comprising, continuously communicating the additional force readings as the stack of valuable media is depleted.

* * * * *